United States Patent
Seto et al.

(10) Patent No.: US 11,041,232 B2
(45) Date of Patent: Jun. 22, 2021

(54) AUSTENITIC STAINLESS STEEL AND PRODUCTION METHOD THEREFOR

(71) Applicant: Nippon Steel & Sumitomo Metal Corporation, Tokyo (JP)

(72) Inventors: Masahiro Seto, Tokyo (JP); Masayuki Sagara, Tokyo (JP); Kenta Yamada, Tokyo (JP); Takahiro Osuki, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 261 days.

(21) Appl. No.: 16/091,126

(22) PCT Filed: Apr. 6, 2017

(86) PCT No.: PCT/JP2017/014414
§ 371 (c)(1),
(2) Date: Oct. 4, 2018

(87) PCT Pub. No.: WO2017/175839
PCT Pub. Date: Oct. 12, 2017

(65) Prior Publication Data
US 2019/0144981 A1 May 16, 2019

(30) Foreign Application Priority Data

Apr. 6, 2016 (JP) .............................. JP2016-076401

(51) Int. Cl.
| | | |
|---|---|---|
| *C21D 9/08* | (2006.01) | |
| *C22C 38/58* | (2006.01) | |
| *C22C 38/60* | (2006.01) | |
| *B23K 35/30* | (2006.01) | |
| *C21D 8/02* | (2006.01) | |
| *C21D 8/06* | (2006.01) | |
| *C21D 8/10* | (2006.01) | |
| *C21D 9/46* | (2006.01) | |
| *C21D 9/52* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/44* | (2006.01) | |
| *C22C 38/48* | (2006.01) | |
| *C21D 6/00* | (2006.01) | |
| *C21D 9/00* | (2006.01) | |
| *C21D 7/02* | (2006.01) | |
| *C21D 7/13* | (2006.01) | |
| *B23K 103/06* | (2006.01) | |
| *B23K 103/04* | (2006.01) | |

(52) U.S. Cl.
CPC .......... *C22C 38/58* (2013.01); *B23K 35/3086* (2013.01); *C21D 6/004* (2013.01); *C21D 6/005* (2013.01); *C21D 6/008* (2013.01); *C21D 7/02* (2013.01); *C21D 7/13* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/065* (2013.01); *C21D 8/105* (2013.01); *C21D 9/0068* (2013.01); *C21D 9/08* (2013.01); *C21D 9/46* (2013.01); *C21D 9/525* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/44* (2013.01); *C22C 38/48* (2013.01); *C22C 38/60* (2013.01); *B23K 2103/05* (2018.08); *B23K 2103/06* (2018.08); *C21D 2211/001* (2013.01)

(58) Field of Classification Search
CPC .......... B23K 2103/05; C21D 2211/001; C21D 6/004; C21D 8/0205; C22C 38/004; C22C 38/44
USPC ........................................................ 148/327
See application file for complete search history.

(56) References Cited

U.S. PATENT DOCUMENTS

| | | | | |
|---|---|---|---|---|
| 8,133,431 | B2 * | 3/2012 | Osuki | ................... C22C 38/001 420/54 |
| 2006/0243356 | A1 | 11/2006 | Oikawa et al. | |
| 2014/0137994 | A1 * | 5/2014 | Ueyama | ................ C22C 38/004 148/608 |

(Continued)

FOREIGN PATENT DOCUMENTS

| | | |
|---|---|---|
| CN | 102816978 A | 12/2012 |
| CN | 104611624 A | 5/2015 |

(Continued)

OTHER PUBLICATIONS

Dec. 12, 2018 (EP) Extended European Search Report App. No. 17779217.3.

(Continued)

*Primary Examiner* — Jie Yang

(74) *Attorney, Agent, or Firm* — Banner & Witcoff, Ltd.

(57) ABSTRACT

An austenitic stainless steel is provided which has a chemical composition that consists, by mass %, of: C: 0.015% or less, Si: 1.00% or less, Mn: 2.00% or less, P: 0.05% or less, S: 0.030% or less, Cr: 16.0% or more and less than 22.0%, Ni: 11.0 to 16.0%, Mo: 2.5 to 5.0%, N: 0.07% or more and less than 0.15%, Nb: 0.20 to 0.50%, Al: 0.005 to 0.040%, Sn: 0 to 0.080%, Zn: 0 to 0.0060%, Pb: 0 to 0.030%, and the balance: Fe and impurities, and that satisfies the formula [$Mo_{SS}/Mo \geq 0.98$] ($Mo_{SS}$: Mo amount dissolved in the steel).

21 Claims, No Drawings

(56) References Cited

U.S. PATENT DOCUMENTS

2019/0194787 A1* 6/2019 Okada .................... C22C 38/46

FOREIGN PATENT DOCUMENTS

| | | |
|---|---|---|
| JP | H02170946 A | 7/1990 |
| JP | H04346638 A | 12/1992 |
| JP | H11256283 A | 9/1999 |
| JP | 2000001755 A | 1/2000 |
| JP | 2015-062910 A | 4/2015 |
| JP | 2015-526586 A | 9/2015 |
| WO | 2009044802 A1 | 4/2009 |

OTHER PUBLICATIONS

Oct. 22, 2019 (ID) First Office Action Applicaiton No. P00201808257.
Dec. 4, 2019 (CN) Office Action Application No. 201780022184.3.
Nov. 21, 2019 (CA) Office Action App. No. 3,020,258.
Dec. 2, 2019 (KR) Office Action Application No. 10-2018-7032084.

* cited by examiner

AUSTENITIC STAINLESS STEEL AND PRODUCTION METHOD THEREFOR

RELATED APPLICATION DATA

This application is a National Stage Application under 35 U.S.C. 371 of co-pending PCT application number PCT/JP2017/014414 designating the United States and filed Apr. 6, 2017; which claims the benefit of JP application number 2016-076401 and filed Apr. 6, 2016 each of which are hereby incorporated by reference in their entireties.

TECHNICAL FIELD

The present invention relates to an austenitic stainless steel and a method for producing the austenitic stainless steel, and particularly relates to an austenitic stainless steel that is excellent in naphthenic acid corrosion resistance and a method for producing the austenitic stainless steel.

BACKGROUND ART

The new construction of thermal power generation boilers, petroleum refining plants and petrochemical industry plants has been proceeding in recent years due to growing demands for energy. An austenitic stainless steel that is used in heating furnace pipes and the like of such facilities is required to have excellent corrosion resistance. In particular, oil prices are steadily increasing due to the economic growth of developing nations, and consideration is being given to the use of inferior-quality crude oil which is inexpensive and which has not been used heretofore.

On the basis of the aforementioned technological background, for example, Patent Document 1 discloses a high-alloy stainless steel for chimney stacks, smoke flues and desulfurization equipment that is excellent in corrosion resistance. Further, Patent Document 2 discloses a sulfuric acid dew-point corrosion-resistant stainless steel that is excellent for use in sensitive parts to corrosion caused by a sulfuric acid solution, such as a heat exchanger, a smoke flue and a chimney stack of heavy oil combustion boilers and the like.

In addition, Patent Document 3 discloses an austenitic stainless steel that has excellent resistance properties with respect to sulfuric acid corrosion that poses a problem in heat exchangers, smoke flues, and chimney stacks that are used in thermal power generation and industrial boilers and the like. Further, Patent Document 4 discloses an austenitic stainless steel which contains C-fixing elements that has high corrosion resistance, in particular, high resistance to polythionic acid stress corrosion cracking.

LIST OF PRIOR ART DOCUMENTS

Patent Document

Patent Document 1: JP2-170946A
Patent Document 2: JP4-346638A
Patent Document 3: JP2000-1755A
Patent Document 4: WO 2009/044802

SUMMARY OF INVENTION

Technical Problem

It is known that naphthenic acid corrosion occurs in the crude distillation unit/Vacuum distillation unit including transfer line and other equipment of petroleum refining plants when crude oil of inferior quality is used. It is predicted that in the future the problem of such corrosion will become manifest because it will be necessary to increase the usage ratio of crude oil of inferior quality and, by extension, the amount of such crude oil that is refined.

However, the aforementioned problem of naphthenic acid corrosion is not adequately considered in Patent Documents 1 to 4, and there is a need to develop a steel that has excellent naphthenic acid corrosion resistance.

Up to now it has been said that total acid number (TAN) and flow rate are dominant influences with respect to naphthenic acid corrosion. However, it is not the case that a correlation is always observed between the TAN and the corrosion rate, and it is considered that the situation varies depending on the kinds of acid as well as the structure and content and the like. Thus, as far as it goes, it is extremely difficult to predict the corrosion rate by analyzing a corrosion environment. Therefore, it is necessary to review the situation from the material aspect and to design the composition of a material that is excellent in naphthenic acid corrosion resistance.

The present invention has been made to solve the problem described above, and an objective of the present invention is to provide an austenitic stainless steel that has both excellent naphthenic acid corrosion resistance and economic efficiency, and a method for producing the austenitic stainless steel.

Solution to Problem

The present inventors conducted intensive studies with respect to designing the composition of a material having excellent resistance properties with respect to naphthenic acid corrosion, and as a result obtained the following findings.

Increasing the content of Mo is known as an effective way of improving naphthenic acid corrosion resistance. However, if an excessive amount of Mo is contained, other capabilities than corrosion resistance, such as toughness and weldability, deteriorate, which poses a problem. Further, containing an excessive amount of expensive Mo is not preferable as this also reduces the economic efficiency.

Therefore, in order to examine in detail the mechanism by which Mo enhances naphthenic acid corrosion resistance, the present inventors conducted studies regarding the outer layer of test specimens undergone a naphthenic acid corrosion test. The results revealed that a coating film of a sulfide of Mo, or MoS, is formed on the outer layer of the test specimens, and the coating film contributes to enhancing the naphthenic acid corrosion resistance.

However, it was found that if a large amount of Mo is present as precipitates, Mo does not serve as material of the coating film, but on the contrary hinders the formation of the coating film. In other words, it is not sufficient to merely increase the overall amount of Mo, and it is necessary to dissolve Mo in the steel.

The present invention has been made based on the above findings, and the gist of the present invention is an austenitic stainless steel, as well as a steel material, a steel pipe, a steel plate, a steel bar, a wire rod, a forged steel, a valve, a joint and a welding consumable that include the austenitic stainless steel, and also a method for producing the austenitic stainless steel, which are each described hereunder.

(1) An austenitic stainless steel having a chemical composition consisting, by mass percent, of
C: 0.015% or less,
Si: 1.00% or less,
Mn: 2.00% or less,
P: 0.05% or less,
S: 0.030% or less,
Cr: 16.0% or more and less than 22.0%,
Ni: 11.0 to 16.0%,
Mo: 2.5 to 5.0%,
N: 0.07% or more and less than 0.15%,
Nb: 0.20 to 0.50%,
Al: 0.005 to 0.040%,
Sn: 0 to 0.080%,
Zn: 0 to 0.0060%,
Pb: 0 to 0.030%, and
the balance: Fe and impurities,
and satisfying formula (i) below:

$$Mo_{SS}/Mo \geq 0.98 \quad (i)$$

where, Mo in formula (i) represents a content (mass %) of Mo contained in the steel, and $Mo_{SS}$ represents an Mo content (mass %) that is dissolved in the steel.

(2) The austenitic stainless steel according to (1) above, in which:
in the chemical composition, $R_1$ value defined by formula (ii) below satisfies formula (iii) below:

$$R_1 = 0.25Ni + 0.2Cr + (Mo \times (Mo_{SS}/Mo))^{1.45} \quad (ii)$$

$$R_1 \geq 10.2 \quad (iii)$$

where, each symbol of an element in formula (ii) represents a content (mass %) of the corresponding element that is contained in the steel, and $Mo_{SS}$ represents an Mo content (mass %) that is dissolved in the steel.

(3) The austenitic stainless steel according to (1) above, in which:
the chemical composition contains, by mass %, one or more elements selected from:
Sn: 0.002 to 0.080%,
Zn: 0.0002 to 0.0060%, and
Pb: 0.0005 to 0.030%,
and an L value defined by formula (iv) below satisfies formula (v) below:

$$L = 7.6Sn^{0.18} + 9.5Pb^{0.18} + 12.8Zn^{0.2} \quad (iv)$$

$$1.8 \leq L \leq 13.9 \quad (v)$$

where, each symbol of an element in formula (iv) represents a content (mass %) of the corresponding element that is contained in the steel.

(4) The austenitic stainless steel according to (2) above, in which:
the chemical composition contains, by mass %, one or more elements selected from:
Sn: 0.002 to 0.080%,
Zn: 0.0002 to 0.0060%, and
Pb: 0.0005 to 0.030%,
and an L value defined by formula (iv) below satisfies formula (v) below:

$$L = 7.6Sn^{0.18} + 9.5Pb^{0.18} + 12.8Zn^{0.2} \quad (iv)$$

$$1.8 \leq L \leq 13.9 \quad (v)$$

where, each symbol of an element in formula (iv) represents a content (mass %) of the corresponding element that is contained in the steel.

(5) The austenitic stainless steel according to (4) above, in which:
in the chemical composition, $R_2$ value defined by formula (vi) below satisfies formula (vii) below:

$$R_2 = R_1 + (L - 5.1)/3 \quad (vi)$$

$$R_2 \geq 12.0 \quad (vii)$$

where, $R_1$ in formula (vi) is a value defined by formula (ii) above, and L in formula (vi) is a value defined by formula (iv) above.

(6) The austenitic stainless steel according to any one of (1) to (5) above, in which the austenitic stainless steel has a steel micro-structure in which an average grain size number with respect to inside of the steel is 7.0 or more.

(7) An austenitic stainless steel material that includes the austenitic stainless steel according to any one of (1) to (6) above.

(8) An austenitic stainless steel pipe that includes the austenitic stainless steel according to any one of (1) to (6) above.

(9) An austenitic stainless steel plate that includes the austenitic stainless steel according to any one of (1) to (6) above.

(10) An austenitic stainless steel bar that includes the austenitic stainless steel according to any one of (1) to (6) above.

(11) An austenitic stainless wire rod that includes the austenitic stainless steel according to any one of (1) to (6) above.

(12) An austenitic stainless forged steel that includes the austenitic stainless steel according to any one of (1) to (6) above.

(13) An austenitic stainless valve that includes the austenitic stainless steel according to any one of (1) to (6) above.

(14) An austenitic stainless joint that includes the austenitic stainless steel according to any one of (1) to (6) above.

(15) An austenitic stainless welding consumable that includes the austenitic stainless steel according to any one of (1) to (6) above.

(16) A method for producing an austenitic stainless steel, including:
a heat treatment step of heating a steel having a chemical composition according to any one of (1) to (5) for 8 hours or more in a temperature range of more than 1260° C. to not more than 1370° C.;
a hot working step of subjecting the steel to hot working such that a finishing temperature is in a range of 960 to 1150° C.; and
a final heat treatment step of heating the steel for 3 minutes or more in a temperature range of 1000 to 1100° C.

(17) The method for producing an austenitic stainless steel according to (16) above, further including a cold working step of performing cold working under conditions such that a reduction of area is 30% or more.

Advantageous Effects of Invention

According to the present invention it is possible to obtain an austenitic stainless steel that compatibly realizes both excellent naphthenic acid corrosion resistance and economic efficiency without causing the steel quality to deteriorate. The austenitic stainless steel according to the present invention is suitable for use as, for example, an austenitic stainless steel material of pipes, a heating furnace, a distillation unit, a components inside unit, a pump and a heat exchanger of a petroleum refining plant or the like. For example, the austenitic stainless steel material is a steel pipe, a steel plate, a steel bar, a wire rod, a forged steel, a valve, a joint or a welding consumable.

DESCRIPTION OF EMBODIMENTS

The respective requirements of the present invention are described in detail hereunder.

(A) Chemical Composition

The reasons for limiting each element are as follows. Note that the symbol "%" with respect to content in the following description represents "mass percent".

C: 0.015% or Less

C is an element that has an effect of stabilizing the austenite phase, and also forms fine carbides within the grains to thereby contribute to improving high temperature strength. Therefore, from the viewpoint of securing high temperature strength, a content of C corresponding to the content of carbide-forming elements is preferable for the purpose of strengthening by precipitation of carbides within the grains. However, from the viewpoint of securing corrosion resistance, in particular naphthenic acid corrosion resistance, it is desirable for the content of C to be as low as possible such that sensitization due to precipitation of Cr carbides formed by C binding to Cr may be suppressed. When the C content is excessive, in particular at a content level of more than 0.015%, C causes a marked deterioration in corrosion resistance. Therefore, the C content is set to 0.015% or less. The C content is preferably 0.010% or less. On the other hand, when it is desired to obtain the aforementioned effects, the C content is preferably set to 0.005% or more.

Si: 1.00% or Less

Si is an element which has a deoxidizing action during melting of the austenitic stainless steel, and is also effective for increasing oxidation resistance and steam oxidation resistance and the like. However, because Si is an element that stabilizes the ferritic phase, if the content thereof is excessive, in particular at a content level of more than 1.00%, the Si lowers the stability of the austenite phase. Therefore, the Si content is set to not more than 1.00%. The Si content is preferably not more than 0.80%, and more preferably is not more than 0.65%. On the other hand, when it is desired to obtain the aforementioned effects the Si content is preferably set to not less than 0.02%, and more preferably is set to not less than 0.10%.

Mn: 2.00% or Less

Mn is an element which stabilizes the austenite phase, and is also an effective element for suppressing hot working brittleness due to S and for deoxidation during melting. However, if the content of Mn is more than 2.00%, Mn promotes the precipitation of intermetallic compound phases such as the a phase, and in the case of use in a high temperature environment, also causes a decrease in toughness and ductility which is attributable to a deterioration in microstructural stability at high temperatures. Therefore, the Mn content is set to not more than 2.00%. The Mn content is preferably not more than 1.50%. On the other hand, when it is desired to obtain the aforementioned effects the Mn content is preferably set to not less than 0.02%, and more preferably is set to not less than 0.10%.

P: 0.05% or Less

P promotes intergranular corrosion and causes a decrease in grain boundary strength, and hence causes a deterioration in naphthenic acid corrosion resistance. Therefore, the P content is set to not more than 0.05%. The P content is preferably not more than 0.035%.

S: 0.030% or Less

Similarly to P, S also promotes intergranular corrosion and causes a decrease in grain boundary strength, and hence causes a deterioration in naphthenic acid corrosion resistance. Therefore, the S content is set to not more than 0.030%. The S content is preferably not more than 0.025%.

Cr: 16.0% or More and Less than 22.0%

Cr is an essential element for ensuring the oxidation resistance and corrosion resistance at high temperatures, and in order to obtain such effects it is necessary that the Cr content be not less than 16.0%. However, when the Cr content is excessive, in particular at a content level of 22.0% or more, the Cr lowers the stability of the austenite phase at high temperatures and thus causes a decrease in creep strength. Therefore, the content of Cr is set in a range of 16.0% to less than 22.0%. The Cr content is preferably 17.0% or more. Further, the Cr content is preferably not more than 21.0%, and more preferably is not more than 20.0%.

Ni: 11.0 to 16.0%

Ni is an essential element for ensuring a stable austenitic microstructure and is also an essential element for ensuring the microstructural stability during a long period of use and thus obtaining the desired level of creep strength. To sufficiently obtain these effects, the balance with the Cr content mentioned above is important, and in consideration of the lower limit value of the Cr content in the present invention, it is necessary to set the Ni content to not less than 11.0%. On the other hand, the addition of the expensive element Ni in an amount that is more than 16.0% results in an increase in cost. Therefore, the content of Ni is set in a range of 11.0 to 16.0%. The Ni content is preferably not less than 11.8%, and is preferably not more than 14.3%.

Mo: 2.5 to 5.0%

Mo dissolves in the matrix and is an element which contributes to the enhancement of high temperature strength, in particular to the enhancement of creep strength at high temperatures. Mo also has an action that suppresses grain boundary precipitation of Cr carbides. In addition, Mo binds with S in a usage environment to form a sulfide coating film, and thereby contributes to improving naphthenic acid corrosion resistance. To obtain these effects, it is necessary to contain 2.5% or more of Mo. However, if the content of Mo is too large, on the contrary Mo reduces the creep strength because the stability of the austenite phase decreases. In particular, if the Mo content is more than 5.0%, there is a marked reduction in the creep strength. Therefore, the Mo content is set in the range of 2.5 to 5.0%. The Mo content is preferably not less than 2.8%, and is preferably not more than 4.5%.

As described above, the element that directly participates in improving naphthenic acid corrosion resistance is dissolved Mo. If the Mo amount that is present as precipitate is excessive, not only will there be insufficient dissolved Mo to serve as material for a sulfide coating film, but the formation of the coating film will also be hindered. Therefore, in addition to the Mo content being in the aforementioned range, it is necessary for the proportion of the dissolved amount with respect to the total amount of Mo to satisfy the following formula (i).

$$Mo_{SS}/Mo \geq 0.98 \qquad (i)$$

Where, each symbol of an element in formula (i) represents a content (mass %) of the corresponding element that is contained in the steel, and $Mo_{SS}$ represents the Mo content (mass %) that is dissolved in the steel.

Further, in addition to the proportion of the dissolved amount with respect to the total amount of Mo, it is possible to economically improve the naphthenic acid corrosion resistance by containing a suitable balance with respect to the contents of Ni and Cr. Therefore, with regard to the relation between the proportion of the dissolved amount with respect to the total amount of Mo and the contents of Ni and Cr, it is also preferable that an $R_1$ value defined by formula (ii) below satisfies formula (iii) below.

$$R_1 = 0.25Ni + 0.2Cr + (Mo \times (Mo_{SS}/Mo))^{1.45} \quad \text{(ii)}$$

$$R_1 \geq 10.2 \quad \text{(iii)}$$

Where, each symbol of an element in formula (ii) represents a content (mass %) of the corresponding element that is contained in the steel, and $Mo_{SS}$ represents the Mo content (mass %) that is dissolved in the steel.

N: 0.07% or More and Less than 0.15%

N is an element that stabilizes the austenite phase, and is an element that dissolves in the matrix and precipitates as fine carbo-nitrides within the grains and is thus effective in improving the creep strength. In order to sufficiently obtain these effects, the N content is required to be not less than 0.07%. However, when the N content is an excessive amount of 0.15% or more, Cr nitrides are formed on the grain boundaries and therefore the naphthenic acid corrosion resistance deteriorates due to the resulting sensitization. Therefore, the content of N is set in a range of 0.07 to less than 0.15%. The N content is preferably not less than 0.09%, and is preferably not more than 0.14%.

Nb: 0.20 to 0.50%

Nb is a C-fixing element. When Nb and C bind to form carbides and the carbides precipitate within grains, the grain boundary precipitation of Cr carbides is inhibited and sensitization is suppressed, and hence high levels of corrosion resistance can be ensured. Furthermore, the Nb carbides that finely precipitated within grains also contribute to improvement in creep strength. To ensure excellent naphthenic acid corrosion resistance, the Nb content is set to not less than 0.20%.

However, when the content of Nb is excessive, the carbides precipitate excessively within grains and the intragranular deformation is hindered thereby, leading to further stress concentration on the grain boundary interface that has become embrittled by segregation of impurity elements. In particular, when the Nb content is more than 0.5%, the aforementioned adverse effects become significant. Therefore, in order to ensure a high level of corrosion resistance, the Nb content is set to 0.20 to 0.50%. The Nb content is preferably not less than 0.25%, and is preferably not more than 0.45%.

Al: 0.005 to 0.040%

Al is an element that is added as a deoxidizer, and it is necessary for the chemical composition to contain an Al content of not less than 0.005%. However, if more than 0.040% of Al is contained, precipitation of intermetallic compounds is promoted, and toughness and polythionic acid SCC resistance deteriorate during a long period of use. Therefore, the Al content is set in a range of 0.005 to 0.040%. The Al content is preferably not less than 0.008%, and is preferably not more than 0.035%.

Sn: 0 to 0.080%

Zn: 0 to 0.0060%

Pb: 0 to 0.030%

Although Sn, Zn and Pb are normally treated as impurity elements that are elements that adversely affect the steel quality, since these elements have a high affinity to S and are effective elements for improving the naphthenic acid corrosion resistance, they may be contained according to need. However, if these elements are contained in excess, they promote intergranular corrosion and cause a decrease in the grain boundary strength, and therefore, on the contrary, they cause the naphthenic acid corrosion resistance to deteriorate.

Therefore, the contents of Sn, Zn and Pb are set to 0.080% or less, 0.0060% or less and 0.030% or less, respectively. The Sn content is preferably 0.050% or less, the Zn content is preferably 0.0055% or less, and the Pb content is preferably 0.025% or less. When it is desired to obtain the aforementioned effects, the Sn content is preferably 0.002% or more, the Zn content is preferably 0.0002% or more and the Pb content is preferably 0.0005% or more.

Note that, to improve the naphthenic acid corrosion resistance without adversely affecting the steel quality in a manner that takes into consideration the respective degrees of affinity to S of Sn, Zn and Pb, preferably an L value defined by formula (iv) below satisfies formula (v) below.

$$L = 7.6Sn^{0.18} + 9.5Pb^{0.18} + 12.8Zn^{0.2} \quad \text{(iv)}$$

$$1.8 \leq L \leq 13.9 \quad \text{(v)}$$

Where, each symbol of an element in formula (iv) represents a content (mass %) of the corresponding element that is contained in the steel.

As described in the foregoing, the proportion of the dissolved amount with respect to the total amount of Mo, and also the contents of Ni and Cr as well as the contents of Sn, Zn and Pb influence the naphthenic acid corrosion resistance of the steel. It is therefore desirable to design the composition in a manner that takes into account the balance between these elements. Thus, with regard to the relation between the contents of these elements, it is preferable that an $R_2$ value defined by formula (vi) below satisfies formula (vii) below.

$$R_2 = R_1 + (L - 5.1)/3 \quad \text{(vi)}$$

$$R_2 \geq 12.0 \quad \text{(vii)}$$

Where, $R_1$ in formula (vi) is a value defined by the aforementioned formula (ii), and L is a value defined by the aforementioned formula (iv).

(B) Steel Micro-Structure

Grain Size Number: 7.0 or More

A limitation is not particularly set with respect to the steel micro-structure of the austenitic stainless steel according to the present invention. However, if the crystal grains are coarse, the HAZ crack susceptibility during welding increases, and hence it is preferable that the average grain size number with respect to the inside of the steel as defined by ASTM E112 is 7.0 or more. Note that, although a limitation is not particularly set with respect to the upper limit of the grain size number, since the creep strength decreases if the crystal grains are too fine, the grain size number with respect to the inside of the steel is preferably not more than 9.5.

(C) Production Method

Although there are no particular limitations with respect to the conditions for producing the austenitic stainless steel according to the present invention, for example, the austenitic stainless steel can be produced by using the method described hereunder.

Steel having the chemical composition described above is melted in a furnace, and thereafter an ingot is prepared from the molten steel. Immediately after the ingot is heated, the ingot is forged to form a billet. At this time, because segregation of Mo occurs, a heating treatment is performed to diffuse Mo and eliminate the segregation. The heating temperature at such time is preferably in a range of more than 1260° C. to not more than 1370° C. This is because, if the heating temperature is 1260° C. or less, there is a risk that it will not be possible to adequately dissolve the segregated Mo, while on the other hand, if the heating temperature is more than 1370° C., grain boundary melting will occur and the working thereafter will be difficult to perform.

The heating time is preferably set to 8 hours or more. This is because, if the heating time is less than 8 hours there is a risk that Mo segregation will remain even if the billet is heated at a temperature of more than 1260° C. Note that, although it is not necessary to set a particular limit with respect to the upper limit of the heating time, the heating time is preferably not more than 20 hours since the economic efficiency will deteriorate if the heating time is too long. By performing the aforementioned heating treatment, it is possible to increase the proportion of the dissolved amount of Mo and satisfy the above formula (i).

Hot working is performed on the billet that underwent the aforementioned heating treatment. Although hot working can be performed on the billet as it is after the heating treatment, in a case where the Ni content is low, some δ-ferrite remains and the hot workability noticeably decreases, and therefore it is preferable to cool the billet once before performing hot working. Although the cooling rate at such time is not particularly limited, allowing the billet to cool is preferable from the viewpoint of economic efficiency. Note that even if Mo that has dissolved is slowly cooled in the aforementioned cooling process, Mo does not segregate again.

When performing the aforementioned hot working, it is necessary to perform the hot working under the following conditions. For example, after holding the billet for 2 to 10 hours in a temperature range of 1100 to 1250° C., hot working can be performed in such a manner that the finishing temperature is in the range of 960 to 1150° C. If the aforementioned hot working temperature is less than 960° C., not only does the material ductility decrease, but the Mo solubility will also be insufficient, and naphthenic acid corrosion resistance will not be obtained. After hot working, cold working may be performed with the objective of improving the dimensional accuracy or the like. Further, according to need, a softening heat treatment can be performed prior to cold working. In order to make the grain size number with respect to the inside of the steel 7.0 or more, for example, it is preferable to perform cold working under conditions such that the reduction of area becomes 30% or more.

After performing hot working and, depending on the case, additionally performing cold working, a final heat treatment is performed with the objective of eliminating strain that was introduced by the working, to thereby make the steel quality uniform in the wall thickness direction. To obtain a fine-grained steel micro-structure in which the grain size number inside the steel is 7.0 or more, for example, it is preferable to heat the steel in a temperature range of 1000 to 1100° C. for not less than 3 minutes. After the final heat treatment, the steel is preferably cooled rapidly by a method such as water cooling.

By subjecting the austenitic stainless steel produced by the above method to various kinds of working, it is possible to produce a steel material, a steel pipe, a steel plate, a steel bar, a wire rod, a forged steel, a valve, a joint and a welding consumable and the like. Note that, because Mo that has dissolved once does not segregate again when performing the aforementioned working, it is considered that the effect thereof on naphthenic acid corrosion resistance is extremely small.

Hereunder, the present invention is described specifically by way of examples, although the present invention is not limited to the following examples.

Examples

Steels having the chemical compositions given in Table 1 were melted using a vacuum induction melting furnace (VIM), and ingots were prepared from the molten steels. Thereafter, with respect to Test Nos. 1, 3, 5 to 10, 13, 14, 16 to 18, 20 to 24, 26, 28 to 34, and 37 to 39, immediately after heating the ingots to 1200° C., the ingots were formed into billets having a width of 100 mm and a thickness of 50 mm by forging. Among the respective test samples mentioned above, with regard to Test Nos. 1, 3, 5 to 10, 13, 14, 16 to 18, 20, 31, 34, and 37 to 39, to suppress segregation of Mo, as shown in Table 2, the test samples were heated for 8 hours or more at a temperature of more than 1260° C. With regard to Test No. 32, the test sample was heated for 8 hours at 1260° C. For Test No. 33, the test sample was heated for 7 hours at 1265° C. The other test samples were not subjected to a particular heating treatment.

Thereafter, each billet was hot-rolled at a finishing temperature in a range of 900 to 1150° C., and formed into a steel plate having a width of 100 mm and a thickness of 22 mm. These steel plates were subjected to a softening heat treatment under conditions of a temperature of 1080±20° C. for 20 to 30 minutes, which was followed immediately by water cooling, and thereafter were subjected to cold rolling to produce steel plates having a width of 100 mm and a thickness of 15.4 mm. These steel plates were subjected to a final heat treatment under conditions of a temperature of 1080±20° C. for 3 to 10 minutes, which was followed immediately by water cooling to form austenitic stainless steel plates.

Further, for Test Nos. 2, 4, 11, 12, 15, 19, 25, 27, 35 and 36, forging was performed immediately after heating the ingot to 1200° C. For Test Nos. 2, 11, 19, 27 and 36, the ingot was formed into a billet having a diameter of 320 mm, and for Test Nos. 4, 12, 15, 25 and 35, the ingot was formed into a billet having a diameter of 287 mm. Among the respective test samples mentioned above, for Test Nos. 2, 4, 11, 12, 15, 19 and 35, the test samples were heated for not less than 8 hours at a temperature of more than 1260° C. as shown in Table 2 to suppress segregation of Mo. For Test No. 36, the test sample was heated for 7 hours at 1350° C. The other test samples were not subjected to a particular heating treatment.

Thereafter, for Test Nos. 2, 11, 19, 27 and 36, each billet was formed into a hollow billet having a diameter of 314 mm and an inner diameter of 47 mm, and for Test Nos. 4, 12, 15, 25 and 35, each billet was formed into a hollow billet having a diameter of 281 mm and an inner diameter of 47 mm Each of the thus-formed hollow billets was subjected to an extrusion process at 1250 to 1300° C., and formed into a steel pipe having a diameter of 219.5 mm and a wall thickness of 18.3 mm for Test Nos. 2, 11, 19, 27 and 36, and formed into a steel pipe having a diameter of 168.7 mm and a wall thickness of 7.0 mm for Test Nos. 4, 12, 15, 25 and 35. Water cooling was performed immediately after the aforementioned extrusion process. After the water cooling, the steel pipes were subjected to a final heat treatment under conditions of a temperature of 1000 to 1100° C. and a time period of 3 to 10 minutes. Water cooling was performed again immediately after the final heat treatment, to thereby obtain austenitic stainless steel pipes.

TABLE 1

| Steel | Chemical composition (in mass %, balance: Fe and impurities) | | | | | | | | | | | | | |
|---|---|---|---|---|---|---|---|---|---|---|---|---|---|---|
| No. | C | Si | Mn | P | S | Cr | Ni | Mo | N | Nb | Al | Sn | Zn | Pb |
| 1 | 0.010 | 0.29 | 0.92 | 0.025 | 0.016 | 19.8 | 14.9 | 5.0 | 0.07 | 0.28 | 0.010 | 0.047 | 0.0005 | 0.0007 |
| 2 | 0.015 | 0.72 | 1.05 | 0.040 | 0.003 | 18.3 | 14.0 | 5.0 | 0.10 | 0.30 | 0.014 | 0.046 | 0.0003 | 0.0033 |
| 3 | 0.011 | 0.94 | 0.77 | 0.033 | 0.026 | 19.4 | 13.9 | 4.5 | 0.08 | 0.21 | 0.015 | 0.031 | 0.0005 | 0.0280 |
| 4 | 0.011 | 0.39 | 1.32 | 0.027 | 0.001 | 20.1 | 14.4 | 3.4 | 0.12 | 0.22 | 0.012 | 0.018 | 0.0002 | 0.0019 |
| 5 | 0.015 | 0.52 | 1.51 | 0.034 | 0.008 | 16.1 | 11.7 | 3.9 | 0.12 | 0.40 | 0.015 | 0.002 | 0.0032 | 0.0025 |
| 6 | 0.012 | 0.18 | 0.90 | 0.011 | 0.017 | 21.4 | 11.1 | 3.5 | 0.13 | 0.46 | 0.015 | 0.051 | 0.0055 | 0.0021 |
| 7 | 0.007 | 0.54 | 1.44 | 0.012 | 0.007 | 18.7 | 14.1 | 3.0 | 0.14 | 0.35 | 0.011 | 0.028 | 0.0019 | 0.0300 |
| 8 | 0.007 | 0.18 | 1.53 | 0.008 | 0.001 | 17.9 | 12.8 | 3.2 | 0.11 | 0.34 | 0.024 | 0.054 | 0.0011 | 0.0006 |
| 9 | 0.012 | 0.35 | 1.22 | 0.038 | 0.018 | 18.5 | 13.6 | 2.8 | 0.12 | 0.21 | 0.015 | 0.018 | 0.0017 | 0.0250 |
| 10 | 0.005 | 0.77 | 1.89 | 0.025 | 0.019 | 16.5 | 12.1 | 3.1 | 0.10 | 0.33 | 0.010 | 0.074 | 0.0035 | 0.0110 |
| 11 | 0.010 | 0.12 | 1.45 | 0.029 | 0.024 | 18.1 | 13.8 | 2.8 | 0.13 | 0.37 | 0.030 | 0.037 | 0.0029 | 0.0055 |
| 12 | 0.008 | 0.15 | 1.52 | 0.049 | 0.028 | 17.9 | 12.8 | 2.9 | 0.09 | 0.36 | 0.013 | 0.017 | 0.0019 | 0.0048 |
| 13 | 0.015 | 0.18 | 0.60 | 0.021 | 0.005 | 17.2 | 11.5 | 3.0 | 0.12 | 0.33 | 0.011 | 0.002 | 0.0044 | 0.0140 |
| 14 | 0.008 | 0.25 | 1.65 | 0.016 | 0.010 | 16.9 | 11.5 | 2.5 | 0.13 | 0.33 | 0.028 | — | — | — |
| 15 | 0.009 | 0.40 | 1.44 | 0.020 | 0.021 | 17.0 | 11.1 | 2.6 | 0.14 | 0.33 | 0.015 | — | 0.0022 | — |
| 16 | 0.009 | 0.35 | 1.51 | 0.011 | 0.028 | 19.6 | 12.8 | 2.7 | 0.10 | 0.25 | 0.018 | — | — | — |
| 17 | 0.010 | 0.80 | 1.10 | 0.025 | 0.026 | 16.2 | 11.9 | 2.6 | 0.13 | 0.32 | 0.010 | 0.060 | 0.0056 | 0.0252 |
| 18 | 0.005 | 0.59 | 0.90 | 0.014 | 0.017 | 17.1 | 15.9 | 3.7 | 0.09 | 0.44 | 0.012 | — | — | — |
| 19 | 0.008 | 0.32 | 1.47 | 0.018 | 0.025 | 16.8 | 11.2 | 3.2 | 0.14 | 0.30 | 0.015 | — | 0.0011 | 0.0015 |
| 20 | 0.009 | 0.42 | 0.78 | 0.025 | 0.026 | 17.0 | 11.8 | 2.5 | 0.11 | 0.22 | 0.035 | 0.006 | 0.0055 | 0.0285 |
| 21 | 0.010 | 0.33 | 1.82 | 0.028 | 0.027 | 17.9 | 11.1 | 3.1 | 0.10 | 0.21 | 0.016 | — | 0.0044 | 0.0200 |
| 22* | 0.006 | 0.66 | 1.25 | 0.018 | 0.023 | 13.5* | 9.7* | 3.2 | 0.12 | 0.25 | 0.018 | — | — | — |
| 23* | 0.007 | 0.65 | 1.54 | 0.047 | 0.011 | 14.7* | 10.5* | 3.1 | 0.09 | 0.44 | 0.029 | 0.021 | 0.0008 | 0.0006 |
| 24* | 0.010 | 0.57 | 0.89 | 0.018 | 0.020 | 18.7 | 11.5 | 2.0* | 0.14 | 0.45 | 0.010 | — | 0.0030 | — |
| 25 | 0.012 | 0.20 | 1.10 | 0.011 | 0.008 | 16.1 | 11.5 | 2.6 | 0.13 | 0.40 | 0.014 | 0.007 | — | 0.0005 |
| 26* | 0.010 | 0.72 | 1.79 | 0.037 | 0.020 | 16.3 | 11.8 | 2.3* | 0.10 | 0.29 | 0.015 | — | — | — |
| 27* | 0.009 | 0.80 | 1.58 | 0.022 | 0.013 | 15.2* | 10.4* | 2.6 | 0.10 | 0.24 | 0.008 | — | — | 0.0220 |
| 28* | 0.008 | 0.30 | 0.88 | 0.019 | 0.015 | 15.2* | 11.2 | 2.1* | 0.09 | 0.28 | 0.015 | 0.005 | 0.0020 | — |
| 29* | 0.009 | 0.51 | 1.31 | 0.048 | 0.025 | 14.9* | 10.7* | 2.2* | 0.14 | 0.35 | 0.012 | — | — | — |
| 30* | 0.005 | 0.51 | 0.85 | 0.011 | 0.010 | 15.8* | 10.9* | 1.5* | 0.10 | 0.44 | 0.038 | 0.041 | 0.0009 | 0.0015 |
| 31* | 0.009 | 0.34 | 1.36 | 0.006 | 0.005 | 20.4 | 15.6 | 2.4* | 0.12 | 0.28 | 0.035 | 0.035 | 0.0052 | 0.0222 |
| 32 | 0.010 | 0.70 | 1.53 | 0.020 | 0.015 | 18.0 | 12.5 | 2.6 | 0.11 | 0.30 | 0.014 | 0.005 | — | 0.0012 |
| 33 | 0.015 | 0.79 | 1.11 | 0.010 | 0.008 | 20.3 | 11.2 | 3.2 | 0.14 | 0.33 | 0.015 | — | 0.0048 | 0.0052 |
| 34* | 0.009 | 0.58 | 2.05* | 0.030 | 0.007 | 18.8 | 14.6 | 2.5 | 0.12 | 0.42 | 0.015 | — | — | — |
| 35* | 0.014 | 1.05* | 1.00 | 0.011 | 0.002 | 16.0 | 11.1 | 2.7 | 0.08 | 0.22 | 0.012 | 0.067 | 0.0056 | 0.0240 |
| 36 | 0.008 | 0.55 | 1.45 | 0.018 | 0.008 | 20.1 | 15.8 | 4.2 | 0.10 | 0.30 | 0.015 | — | — | — |
| 37* | 0.011 | 0.29 | 1.18 | 0.030 | 0.001 | 18.5 | 15.4 | 3.5 | 0.22* | 0.29 | 0.028 | 0.065 | 0.0060 | 0.0262 |
| 38* | 0.018* | 0.66 | 1.89 | 0.025 | 0.011 | 16.2 | 11.5 | 2.6 | 0.12 | 0.40 | 0.011 | 0.045 | 0.0049 | 0.0220 |
| 39 | 0.010 | 0.30 | 1.59 | 0.038 | 0.012 | 17.3 | 12.5 | 3.6 | 0.14 | 0.22 | 0.014 | 0.055 | 0.0005 | 0.0042 |

*indicates that conditions do not satisfy those defined by the present invention.

Approximately 0.4 g of each of the aforementioned test samples was electrolyzed in a 10% acetylacetone-1% tetramethylammonium chloride-methanol electrolyte for which a current value was 20 mA/cm². Thereafter, the solution of the electrolyzed test sample was filtrated using a 0.2 μm filter, and the residue was subjected to acid decomposition using a mixed acid consisting of sulfuric acid+phosphoric acid+nitric acid+perchloric acid. The residual amount of Mo was then determined using an ICP emission spectrophotometer, and the solubility of Mo was determined by deducting the residual amount of Mo from the Mo amount (ladle analysis value) in the molten steel. The proportion of the dissolved amount ($Mo_{SS}$/Mo) with respect to the total amount of Mo was then calculated.

In addition, an $R_1$ value defined by formula (ii) below, an L value defined by formula (iv) below, and an $R_2$ value defined by formula (vi) below were calculated based on the relation with the chemical composition.

$$R_1 = 0.25Ni + 0.2Cr + (Mo \times (Mo_{SS}/Mo))^{1.45} \quad \text{(ii)}$$

$$L = 7.6Sn^{0.18} + 9.5Pb^{0.18} + 12.8Zn^{0.2} \quad \text{(iv)}$$

$$R_2 = R_1 + (L - 5.1)/3 \quad \text{(vi)}$$

Next, for each of the aforementioned test samples, a test specimen for micro-structure observation was extracted from inside the steel, and after polishing a cross-section in the longitudinal direction using emery paper and a buff, etching was performed using a mixed acid, after which the surface was observed using an optical microscope. The grain size number of the observation surface was determined in accordance with a determination method performed by a comparative method using the grain size standard view plate I defined in ASTM E112. Note that the average grain size number of the aforementioned test specimen for microstructure observation was calculated by extracting 10 test samples at random from the overall wall thickness of the steel, and then performing observation by optical microscope with respect to the 10 visual fields, and calculating the average of the respective grain size numbers that were obtained.

Further, a naphthenic acid corrosion test that is described hereinafter was performed, and the corrosion rate (mm/y) was calculated. First, a portion was extracted from each test sample, the surface of the portion was polished with #600 emery paper, and a corrosion test specimen having a width of 10 mm, a thickness of 3 mm and a length of 30 mm was prepared.

Using an autoclave, each corrosion test specimen was immersed for 48 hours in crude oil of inferior quality at 135 Pa and 350° C. in a nitrogen (N) atmosphere. The crude oil of inferior quality corresponded to total acid number 6 defined in ASTM D664-11a. The corrosion test specimen was taken out after 48 hours had elapsed. Note that, as the corrosion test proceeded the acid in the crude oil of inferior quality was consumed and the TAN value decreased, and therefore after the corrosion test specimen was immersed for 24 hours the crude oil of inferior quality was completely exchanged for new crude oil of inferior quality by utilizing a drainage outlet and an inlet port of the autoclave, and after the immersion test was performed for a total of 48 hours the corrosion test specimen was taken out from the inside of the autoclave.

Soot was firmly adhered to the corrosion test specimen after being taken out from the inside of the autoclave. Therefore, after performing a blasting treatment using alumina for 5 seconds and removing firmly adhered soot, the remaining soot was subjected to pickling in a citric acid ammonium solution at 100° C. for 60 minutes and thereby removed from the corrosion test specimen. Thereafter, ultrasonic cleaning using acetone was performed for 3 minutes.

Next, the weight of the pre-test corrosion test specimen and the weight of the corrosion test specimen after the aforementioned ultrasonic cleaning were each measured, and a difference between the measured weights was calculated as the corrosion loss. The corrosion rate was then determined based on the surface area and specific gravity of the corrosion test specimen and the test time period.

The results of these tests are shown collectively in Table 2. Note that, in the present invention, the naphthenic acid corrosion resistance was evaluated as being excellent in a case where the corrosion rate was not more than 1.50 mm/y.

TABLE 2

| | | Heat treatment step | | Final heat treatment step | | | | | | | | |
|---|---|---|---|---|---|---|---|---|---|---|---|---|
| Test No. | Steel No. | Heat treatment† temperature (° C.) | Heat treatment† time (h) | Hot working step Hot finishing temperature (° C.) | Final heat treatment temperature (° C.) | Final heat treatment time (min) | $Mo_{ss}$/Mo | $R_1$#1 value | $L$#2 value | $R_2$#3 value | Grain size number | Corrosion rate (mm/y) | |
| 1 | 1 | 1291 | 8 | 1020 | 1080 | 3 | 0.99 | 17.9 | 9.8 | 19.4 | 7.5 | 0.84 | Inventive |
| 2 | 2 | 1310 | 8 | — | 1090 | 4 | 1.00 | 17.5 | 10.3 | 19.2 | 7.2 | 0.86 | example |
| 3 | 3 | 1262 | 8 | 960 | 1080 | 9 | 0.98 | 16.0 | 11.9 | 18.2 | 7.2 | 0.94 | |
| 4 | 4 | 1286 | 8 | — | 1020 | 3 | 0.98 | 13.3 | 9.1 | 14.7 | 8.8 | 1.17 | |
| 5 | 5 | 1298 | 8 | 1130 | 1080 | 8 | 1.00 | 13.3 | 9.8 | 14.9 | 7.6 | 1.19 | |
| 6 | 6 | 1302 | 9 | 1150 | 1080 | 3 | 0.98 | 13.0 | 12.1 | 15.4 | 7.8 | 1.21 | |
| 7 | 7 | 1368 | 8 | 980 | 1080 | 3 | 1.00 | 12.2 | 12.7 | 14.7 | 7.6 | 1.32 | |
| 8 | 8 | 1282 | 16 | 1150 | 1080 | 8 | 0.99 | 12.0 | 10.3 | 13.8 | 7.0 | 1.33 | |
| 9 | 9 | 1265 | 8 | 1140 | 1080 | 3 | 1.00 | 11.6 | 12.2 | 13.9 | 7.2 | 1.40 | |
| 10 | 10 | 1311 | 8 | 1080 | 1080 | 4 | 1.00 | 11.5 | 13.1 | 14.2 | 7.4 | 1.41 | |
| 11 | 11 | 1288 | 8 | — | 1020 | 6 | 0.98 | 11.4 | 11.9 | 13.7 | 8.5 | 1.41 | |
| 12 | 12 | 1320 | 8 | — | 1050 | 3 | 1.00 | 11.5 | 10.9 | 13.4 | 8.0 | 1.42 | |
| 13 | 13 | 1330 | 8 | 1020 | 1080 | 3 | 0.98 | 11.1 | 11.2 | 13.1 | 7.2 | 1.47 | |
| 14 | 14 | 1290 | 8 | 1120 | 1080 | 5 | 0.98 | 9.9 | 0.0 | 8.2 | 7.2 | 1.50 | |
| 15 | 15 | 1265 | 8 | — | 1050 | 6 | 0.98 | 10.1 | 3.8 | 9.6 | 7.4 | 1.47 | |
| 16 | 16 | 1312 | 8 | 1110 | 1080 | 5 | 1.00 | 11.3 | 0.0 | 9.6 | 7.2 | 1.42 | |
| 17 | 17 | 1265 | 8 | 1140 | 1080 | 5 | 0.98 | 10.1 | 14.0 | 13.1 | 7.0 | 1.47 | |
| 18 | 18 | 1285 | 8 | 1120 | 1060 | 3 | 1.00 | 14.1 | 0.0 | 12.4 | 8.0 | 1.39 | |
| 19 | 19 | 1290 | 20 | — | 1080 | 6 | 0.99 | 11.5 | 6.2 | 11.9 | 7.0 | 1.47 | |
| 20 | 20 | 1265 | 16 | 980 | 1100 | 6 | 0.98 | 10.0 | 12.6 | 12.5 | 6.6 | 1.46 | |
| 21 | 21 | —‡ | —‡ | 1120 | 1080 | 3 | 0.73* | 9.6 | 9.0 | 10.9 | 7.3 | 1.72 | Comparative |
| 22 | 22* | —‡ | —‡ | 1060 | 1080 | 6 | 0.88* | 9.6 | 0.0 | 7.9 | 7.4 | 1.77 | example |
| 23 | 23* | —‡ | —‡ | 990 | 1080 | 8 | 0.81 | 9.4 | 9.4 | 10.8 | 7.5 | 1.81 | |
| 24 | 24* | —‡ | —‡ | 950 | 1080 | 8 | 0.92* | 9.0 | 4.0 | 8.7 | 7.8 | 1.88 | |
| 25 | 25 | —‡ | —‡ | — | 1030 | 4 | 0.67* | 8.3 | 5.5 | 8.5 | 9.2 | 2.03 | |
| 26 | 26* | —‡ | —‡ | 1130 | 1080 | 5 | 0.70* | 8.2 | 0.0 | 6.5 | 7.0 | 2.09 | |
| 27 | 27* | —‡ | —‡ | — | 1080 | 4 | 0.71* | 8.1 | 4.8 | 8.0 | 6.9 | 2.16 | |
| 28 | 28* | —‡ | —‡ | 1080 | 1080 | 5 | 0.78* | 7.9 | 6.6 | 8.4 | 7.2 | 2.18 | |
| 29 | 29* | —‡ | —‡ | 1000 | 1080 | 8 | 0.77* | 7.8 | 0.0 | 6.1 | 7.4 | 2.24 | |
| 30 | 30* | —‡ | —‡ | 960 | 1080 | 3 | 0.87* | 7.4 | 10.4 | 9.1 | 7.4 | 2.35 | |
| 31 | 31* | 1322 | 8 | 1020 | 1080 | 5 | 1.00 | 11.5 | 13.4 | 14.3 | 7.6 | 1.75 | |
| 32 | 32 | 1260 | 8 | 1100 | 1080 | 5 | 0.92* | 10.3 | 5.8 | 10.5 | 7.4 | 1.85 | |
| 33 | 33 | 1265 | 7 | 1130 | 1090 | 3 | 0.92* | 11.6 | 8.1 | 12.6 | 7.3 | 1.73 | |
| 34 | 34* | 1290 | 10 | 970 | 1080 | 3 | 0.98 | 11.1 | 0.0 | 9.4 | 8.8 | 1.54 | |
| 35 | 35* | 1295 | 8 | — | 1090 | 5 | 0.99 | 10.1 | 14.1 | 13.1 | 7.0 | 1.59 | |
| 36 | 36 | 1350 | 7 | — | 1010 | 6 | 0.97* | 15.6 | 0.0 | 13.9 | 9.6 | 1.70 | |
| 37 | 37* | 1310 | 15 | 1150 | 1080 | 7 | 1.00 | 13.7 | 14.2 | 16.7 | 7.2 | 1.52 | |
| 38 | 38* | 1355 | 8 | 1100 | 1090 | 3 | 1.00 | 10.1 | 13.5 | 12.9 | 7.2 | 1.57 | |
| 39 | 39 | 1290 | 8 | 900 | 1080 | 5 | 0.94* | 12.4 | 10.9 | 14.4 | 7.0 | 1.55 | |

*indicates that conditions do not satisfy those defined by the present invention.
†means a heating treatment to suppress the segregation of Mo after hot forging.
‡means that a heat treatment is not peformed.
1$R_1 = 0.25Ni + 0.2Cr + (Mo \times (Mo_{ss}/Mo))^{1.45}$ ... (ii)
2$L = 7.6Sn^{0.18} + 9.5Pb^{0.18} + 12.8Zn^{0.2}$ ... (iv)
3$R_2 = R_1 + (L - 5.1)/3$ ... (vi)

Referring to Table 1 and 2, in Test Nos. 1 to 20 which satisfied the requirements of the chemical composition defined by the present invention and the formula $Mo_{ss}$/Mo≥0.98, the corrosion rate was not more than 1.50 mm/y, and it was possible to obtain the desired naphthenic acid corrosion resistance.

Among the Test Nos. 1 to 20, it was confirmed that the corrosion rate tended to be high in Test Nos. 14 to 20 in which one or more of the $R_1$ value, the L value and the $R_2$ value did not satisfy the preferable range defined by the present invention. In particular, it was confirmed that the corrosion rate in Test No. 14 in which neither the $R_1$ value, the L value nor the $R_2$ value satisfied the preferable range defined by the present invention was 1.50 mm/y which was the highest corrosion rate among the test specimens satisfying the conditions defined by the present invention.

It is considered that because the $R_1$ value is determined by a formula that is composed of elements that have a significant influence on naphthenic acid corrosion resistance, such as Cr and Mo, there is a tendency for the corrosion rate to increase in a case where the $R_1$ value does not satisfy the preferable range. Further, it is considered that when the L value is higher than the upper limit, the excess component, on the contrary, promotes intergranular corrosion, and therefore an L value that is higher than the upper limit causes the corrosion rate to increase.

On the other hand, in Test Nos. 21 to 39 that did not satisfy the conditions defined by the present invention, the corrosion rate was more than 1.50 mm/y, and thus the result was that the naphthenic acid corrosion resistance was inferior. In particular, in a case where the Mo content was less than the lower limit value defined by the present invention, a case where the heating temperature relating to diffusion of Mo was low, or a case where the heating time was short, the corrosion rate was 1.70 mm/y or more as in Test Nos. 21 to 33 and Test No. 36, and thus the result was that the corrosion resistance was inferior. It is considered that the reason for this is that Mo has a particularly large influence on naphthenic acid corrosion resistance.

INDUSTRIAL APPLICABILITY

According to the present invention it is possible to obtain an austenitic stainless steel that compatibly achieves both excellent naphthenic acid corrosion resistance and economic efficiency without causing the steel to deteriorate. The austenitic stainless steel according to the present invention is suitable for use as, for example, an austenitic stainless steel material of pipes, a heating furnace, a distillation unit, a components inside unit, a pump and a heat exchanger of a petroleum refining plant or the like. For example, the austenitic stainless steel material is a steel pipe, a steel plate, a steel bar, a wire rod, a forged steel, a valve, a joint or a welding consumable.

The invention claimed is:

1. An austenitic stainless steel having a chemical composition consisting, by mass percent, of:
C: 0.015% or less,
Si: 1.00% or less,
Mn: 2.00% or less,
P: 0.05% or less,
S: 0.030% or less,
Cr: 16.0% or more and less than 22.0%,
Ni: 11.0 to 16.0%,
Mo: 2.5 to 5.0%,
N: 0.07% or more and less than 0.15%,
Nb: 0.20 to 0.50%,
Al: 0.005 to 0.040%,
Sn: 0 to 0.080%,
Zn: 0 to 0.0060%,
Pb: 0 to 0.030%, and
the balance: Fe and impurities,
and satisfying formula (i) below:

$$Mo_{SS}/Mo \geq 0.98 \qquad \text{(i)}$$

where, Mo in formula (i) represents a content (mass %) of Mo contained in the steel, and $Mo_{SS}$ represents an Mo content (mass %) that is dissolved in the steel.

2. The austenitic stainless steel according to claim 1, wherein:
in the chemical composition, $R_1$ value defined by formula (ii) below satisfies formula (iii) below:

$$R_1=0.25Ni+0.2Cr+(Mo\times(Mo_{SS}/Mo))^{1.45} \qquad \text{(ii)}$$

$$R_1 \geq 10.2 \qquad \text{(iii)}$$

where, each symbol of an element in formula (ii) represents a content (mass %) of the corresponding element that is contained in the steel, and $Mo_{SS}$ represents an Mo content (mass %) that is dissolved in the steel.

3. The austenitic stainless steel according to claim 2, wherein the austenitic stainless steel has a steel microstructure in which a grain size number with respect to inside of the steel is 7.0 or more.

4. The austenitic stainless steel according to claim 2, wherein:
the chemical composition contains, by mass %, one or more elements selected from:
Sn: 0.002 to 0.080%,
Zn: 0.0002 to 0.0060%, and
Pb: 0.0005 to 0.030%,
and an L value defined by formula (iv) below satisfies formula (v) below:

$$L=7.6Sn^{0.18}+9.5Pb^{0.18}+12.8Zn^{0.2} \qquad \text{(iv)}$$

$$1.8 \leq L \leq 13.9 \qquad \text{(v)}$$

where, each symbol of an element in formula (iv) represents a content (mass %) of the corresponding element that is contained in the steel.

5. The austenitic stainless steel according to claim 4, wherein the austenitic stainless steel has a steel microstructure in which a grain size number with respect to inside of the steel is 7.0 or more.

6. The austenitic stainless steel according to claim 4, wherein:
in the chemical composition, $R_2$ value defined by formula (vi) below satisfies formula (vii) below:

$$R_2=R_1+(L-5.1)/3 \qquad \text{(vi)}$$

$$R_2 \geq 12.0 \qquad \text{(vii)}$$

where, $R_1$ in formula (vi) is a value defined by formula (ii) above, and L in formula (vi) is a value defined by formula (iv) above.

7. The austenitic stainless steel according to claim 6, wherein the austenitic stainless steel has a steel microstructure in which a grain size number with respect to inside of the steel is 7.0 or more.

8. The austenitic stainless steel according to claim 1, wherein:
the chemical composition contains, by mass %, one or more elements selected from:
Sn: 0.002 to 0.080%,
Zn: 0.0002 to 0.0060%, and
Pb: 0.0005 to 0.030%,
and an L value defined by formula (iv) below satisfies formula (v) below:

$$L=7.6Sn^{0.18}+9.5Pb^{0.18}+12.8Zn^{0.2} \qquad \text{(iv)}$$

$$1.8 \leq L \leq 13.9 \qquad \text{(v)}$$

where, each symbol of an element in formula (iv) represents a content (mass %) of the corresponding element that is contained in the steel.

9. The austenitic stainless steel according to claim 8, wherein the austenitic stainless steel has a steel microstructure in which a grain size number with respect to inside of the steel is 7.0 or more.

10. The austenitic stainless steel according to claim 1, wherein the austenitic stainless steel has a steel microstructure in which a grain size number with respect to inside of the steel is 7.0 or more.

11. An austenitic stainless steel material that includes an austenitic stainless steel according to claim 1.

12. An austenitic stainless steel pipe that includes the austenitic stainless steel according to claim 1.

13. An austenitic stainless steel plate that includes the austenitic stainless steel according to claim 1.

14. An austenitic stainless steel bar that includes the austenitic stainless steel according to claim 1.

15. An austenitic stainless wire rod that includes the austenitic stainless steel according to claim 1.

16. An austenitic stainless forged steel that includes the austenitic stainless steel according claim 1.

17. An austenitic stainless valve that includes the austenitic stainless steel according to claim 1.

18. An austenitic stainless joint that includes the austenitic stainless steel according to claim 1.

19. An austenitic stainless welding material that includes the austenitic stainless steel according to claim 1.

20. A method for producing an austenitic stainless steel, comprising:
   a heat treatment step of heating a steel having a chemical composition according to claim 1 for 8 hours or more in a temperature range of more than 1260° C. to not more than 1370° C.;
   a hot working step of subjecting the steel to hot working such that a finishing temperature is in a range of 960 to 1150° C.; and
   a finishing heat treatment step of heating the steel for 3 minutes or more in a temperature range of 1000 to 1100° C.

21. The method for producing an austenitic stainless steel according to claim 20, further comprising:
   a cold working step of performing cold working under conditions such that a reduction of area is 30% or more.

* * * * *